United States Patent [19]

Sickafus

[11] Patent Number: 4,812,199
[45] Date of Patent: Mar. 14, 1989

[54] RECTILINEARLY DEFLECTABLE ELEMENT FABRICATED FROM A SINGLE WAFER

[75] Inventor: Edward N. Sickafus, Grosse Ile, Mich.

[73] Assignee: Ford Motor Company, Dearborn, Mich.

[21] Appl. No.: 135,204

[22] Filed: Dec. 21, 1987

[51] Int. Cl.⁴ .......................................... H01L 21/306
[52] U.S. Cl. ..................................... 156/626; 156/647;
156/659.1; 156/662; 73/862.64; 29/25.41
[58] Field of Search ................. 73/754, 724, 718, 777,
73/517 R, 862.64, 862.62, 777; 361/283, 280;
29/25.41, 825; 156/647, 662, 659.1, 626; 338/4,
5, 36, 47

[56] References Cited

U.S. PATENT DOCUMENTS

| | | | |
|---|---|---|---|
| 3,728,179 | 4/1973 | Davidson et al. | 156/647 |
| 4,056,413 | 11/1977 | Yoshimura | 156/662 |
| 4,071,838 | 1/1978 | Block . | |
| 4,144,516 | 3/1979 | Aine . | |
| 4,342,227 | 8/1982 | Petersen et al. | 73/517 R |
| 4,586,109 | 4/1986 | Peters et al. | 29/25.41 |
| 4,594,639 | 6/1986 | Kuisma | 73/718 |
| 4,653,326 | 3/1987 | Danel et al. | 73/517 R |

FOREIGN PATENT DOCUMENTS 0036931 2/1984 Japan ............................. 156/647
2107472 4/1983 United Kingdom ............... 29/25.41

OTHER PUBLICATIONS

Kuan et al., "Two-Sided Groove Etching Method to Produce Silicon Ink Jet Nozzles", IBM Bulletin, vol. 21, No. 6, Nov. 1978.

*Primary Examiner*—Stewart J. Levy
*Assistant Examiner*—Robert R. Raevis
*Attorney, Agent, or Firm*—Allan J. Lippa; Peter Abolins

[57] ABSTRACT

A suspended element etched in a silicon substrate whcih is deflected in linear proportion to an applied force. A pair of flexing member symmetrically positioned around the suspended element provides rectilinear movement of the suspended element in response to the applied force. In one embodiment of the invention, the flexing member is formed in a single etchant step by concurrently etching nearly identical recesses into opposing planar surfaces of the silicon substrate. In this embodiment, the portions of silicon remaining between the recesses and planar surfaces define the flexing member.

2 Claims, 4 Drawing Sheets

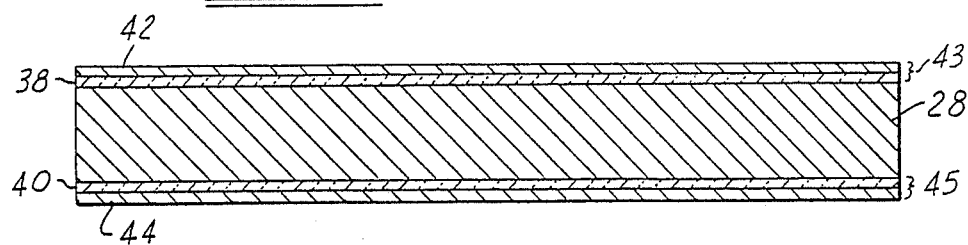
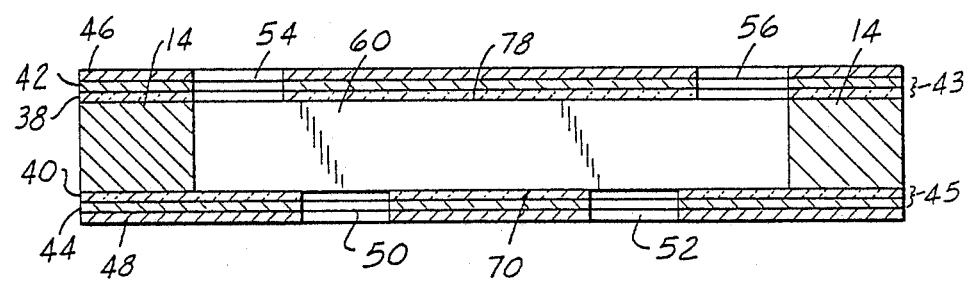
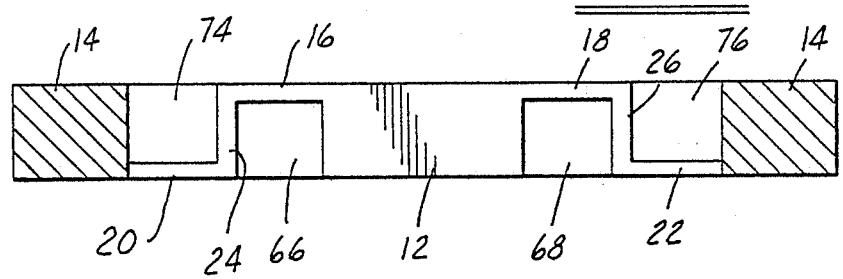

RECTILINEARLY DEFLECTABLE ELEMENT FABRICATED FROM A SINGLE WAFER

BACKGROUND

The present invention relates to deflectable elements which are suitable for use, with appropriate electronics, as either force transducers or actuators.

It is known to fabricate force transducers from silicon substrates by etching suspended beams, or similar structures, which deflect in response to the application of a force to be measured. The deflection may be electronically measured by conventional means such as resistive strain gauges or piezoelectric elements. Typical applications of these force transducers include accelerometers, pressure sensors, gravity sensors, and microphones.

A difficulty encountered with many known devices is that internal bending moments of the suspended structure are cancelled by reactions at the fixed boundary which prohibit flexure with simultaneous boundary displacement. Stated another way, these devices typically have not provided rectilinear displacement of the suspended structure. Accordingly, a nonlinearity has been introduced into the electrical representation of the applied force. Another problem is that the amount of flexure is limited by the amount of bending a given dimension of a silicon structure is able to withstand before fracturing.

A prior approach to provide rectilinear displacement of a suspended element is disclosed in U.S. Pat. No. 4,071,838. More specifically, a structure is disclosed which may be characterized as a pair of opposing E-shaped springs joined together at their, arm extremities and fabricated from a single monocrystalline wafer. The resulting center arm allegedly deflects in a rectilinear relationship to the applied force. A disadvantage of this approach is the complexity of the structure and associated complexity in fabricating. Another disadvantage is that the range of rectilinear displacement is limited by the amount of bending the silicon segments are able to withstand before fracturing.

In another approach, U.S. Pat. No. 4,144,516 discloses a multiple wafer structure, each wafer having a pair of opposing E-shaped springs. The two wafers are bonded together to extend the range of rectilinear deflection of the E-shaped springs. A disadvantage of this approach is the added complexity of the two wafer design.

SUMMARY OF THE INVENTION

An object of the present invention is to provide a suspended element from a single wafer having an extended range of deflection and, more particularly, an extended range of rectilinear deflection.

In one aspect of the invention, the above and other problems are overcome by an apparatus for providing rectilinear movement of a suspended element in response to a force applied to the suspended element wherein the movement is linearly proportional to the applied force. More specifically, the apparatus comprises: a planar substrate including a pair of cavities formed therethrough defining a center member between the cavities and also defining a supporting frame integrally connected to opposing ends of the center member, the center member having a first planar face and an opposing second planar face; the suspended element defined as a central portion of the center member; and a pair of flexing means symmetrically positioned around the suspended element and integrally formed from the center member for providing rectilinear deflection of the suspended element in linear proportion to the applied force, each flexing means comprising a first flexible member defined as a narrowed portion of the center member between a first recess in the first planar surface and a second recess in the second planar surface, the first recess being offset from the second recess The amount of offset between the first recess and the second recess defines the thickness of the narrowed portion. Preferably, the flexing means further comprises a second flexible member defined as a narrowed portion of the center member between the first recess and the second planar surface. It may be also preferable that the flexing means further comprise a third flexible member defined as a portion of the center member between the second recess and the first planar surface. Each flexible member defines a spring having a spring constant related to the substrate material and cross sectional dimension of the flexible member.

In accordance with the aspects of the invention described above, an advantage is obtained of providing a greater range of rectilinear movement from a single substrate than heretofore possible. Further, the range of deflection may be increased by simply etching additional flexible members. Since the recesses may be etched to the same depth, they all may be fabricated in one step thereby obtaining another advantage.

BRIEF DESCRIPTION OF THE DRAWINGS

The objects and advantages described herein will be more fully understood by reading the Description of the Preferred Embodiment with reference to the drawings wherein:

FIGS. 3A-3C illustrate sequential fabrication steps for fabricating the embodiment shown in FIG. 1;

DESCRIPTION OF THE PREFERRED EMBODIMENT

Figure 1:
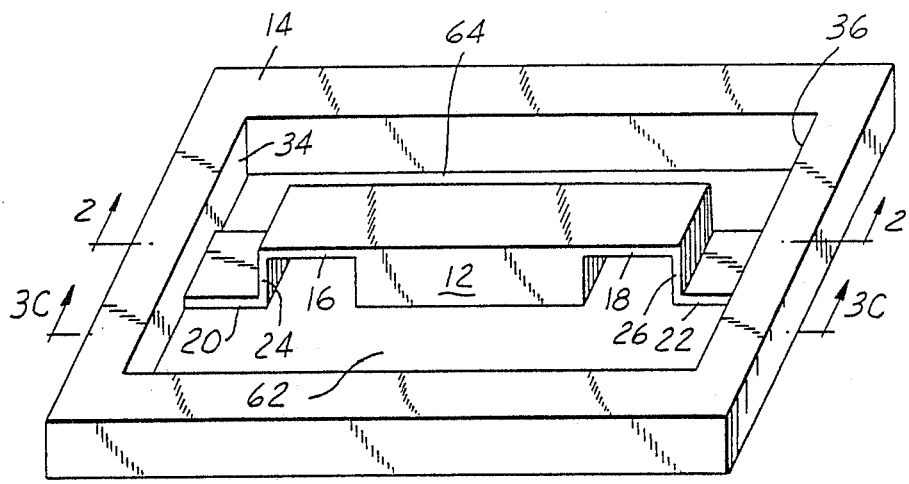
FIG. 1 is a perspective view of an embodiment in which the invention is used to advantage.

In general terms, with reference to FIG. 1, suspended element 12 is shown integrally connected to supporting frame 14 by flexible members 16, 18, 20, 22, 24 and 26. Suspended element 12, frame 14, and each of the flexible members are fabricated from a single wafer or substrate 28 (FIG. 3A) as described in greater detail hereinafter with particular reference to FIGS. 3A through 3C.

Figure 2:
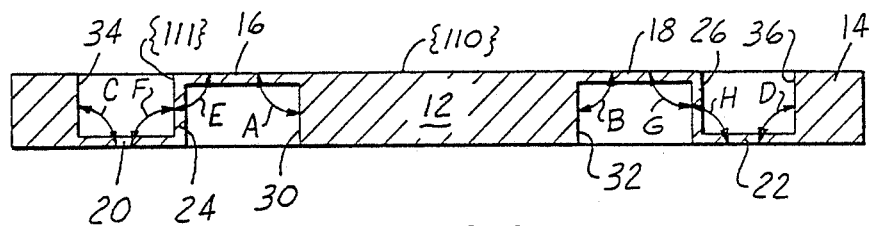
FIG. 2 is a cross-sectional view taken along line 2—2 of FIG. 1.

Continuing with FIG. 1, and also referring to FIG. 2, flexible member 16 and nearly identical flexible member 18 define a pair of flexible members shown connected to respective opposing outer ends 30 and 32 of suspended element 12 forming respective angles A and B therebetween. Similarly, flexible member 20 and nearly identical flexible member 22 define another pair of flexible members connected to respective opposing inner ends 34 and 36 of frame 14 forming respective angles C and D therebetween. Flexible member 24 is shown interconnecting flexible members 16 and 20 thereby forming respective alternate angles E and F. Similarly, flexible member 26 is shown interconnecting flexible members 18 and 22 thereby forming respective alternate angles G and H.

The symmetrical positioning, with respect to suspended element 12, of each flexible member of a respective flexible member pair provides rectilinear movement in response to a force applied against suspended element 12. For example, in the event that a force such as an inertial force deflects suspended element 12 in an upward direction, the bending moments at each boundary of the flexible member causes: angles A and B to decrease by the same degree; angles E and G to increase by the same degree; angles F and H to increase by the same degree; and angles C and D to decrease by the same degree. Accordingly, the boundary between suspended element 12 and flexible member 16 is displaced directly upward; the boundary between flexible members 16 and 24 is displaced upward and toward suspended element 12; and the boundary between flexible members 24 and 20 is displaced upward and away from the suspended element 12. Likewise, the boundaries between suspended element 12, flexible member 18, flexible member 26, and flexible member 22 are displaced in the same manner. This symmetrical movement of the flexible members permits rectilinear deflection of suspended element 12. Further, by the use of appropriate flexible member materials, such as silicon, wherein any strain in the flexible members caused by an applied stress is within their linear range, the deflection of suspended element 12 is in direct linear proportion to the applied force.

Referring to FIGS. 3A through 3C, wherein like numerals refer to like parts shown in FIGS. 1 and 2, the fabrication of suspended element 12, support frame 14, and flexible members 16, 18, 20, 22, 24 and 26 is now described. The fabrication described herein utilizes photolithographic and etching techniques well-known in the microelectronics industry. Substrate 28 is illustrated in FIG. 3A as a silicon wafer, preferably having a thickness of approximately 200 to 500 microns, with major surfaces lying substantially in the {110} plane. Top and bottom silicon oxide layers 38 and 40, respectively, are grown on substrate 28 using conventional techniques well known in the semi-conductor industry. Layer of silicon nitride 42 and layer of silicon nitride 44 are the deposited over respective silicon oxide layers 38 and 40, respectively, using conventional vapor deposition techniques. Layer of silicon oxide 38 and layer of silicon nitride 42 form a conventional passivation layer 43. Similarly, layer of silicon oxide 40 and layer of silicon nitride 44 form passivation layer 45.

Referring now FIG. 3B, center member 60 and frame 14 are formed by etching a pair of openings or cavities 62 and 64 (FIG. 1) through substrate 28 by use of well-known photolithographic technology and wet etching with an anisotropic etchant solution, such as aqueous potassium hydroxide solution or ethylene diamine pyrocatechol solutions. It is to be underttood that dry etching techniques utilizing a gas may also be used, but the intrinsically slower etch rates may be useful only in thin materials.

Photo resist layers 46 and 48 are deposited over respective passivations layers 43 and 45, and passivation openings 50, 52, 54 and 56 are delineated utilizing conventional photolithographic techniques. Passivation openings 50, 52, 54 and 56 are extended through the passivation layers 43 and 45 to expose respective portions of surfaces 70 and 78 of center member 60 as shown in FIG. 3B. Thus, passivation openings 50, 52, 54 and 56 form conventional mask openings for subsequent etching of center member 60.

A wet anisotropic etchant, such as described hereinabove, is applied to etch the exposed portions of surfaces 70 and 78 of center member 60 such that respective recesses 66 and 68 are formed in surface 70 extending from passivation openings 50 and 52; and, respective recesses 74 and 76 are formed in surface 78 extending from passivation openings 54 and 56 as shown in FIG. 3C. Etching of the {110} plane is timed such that flexible members 16, 18, 20 and 22 have a thickness, and accordingly the related flexibility or spring constant desired.

Since the anisotropic etchant acts against the {110} planes at a rate approximately 100 times greater than the etchant acts against the lateral {111} planes, the final shape of the etched areas is determined by the slowly etched {111} surfaces and the remaining unetched {110} surfaces which bound the etched volume. Thus, for the illustrated {110} wafer, recesses 66, 68, 74 and 76 each define a substantially rectangular recess extending inwardly from the passivation openings.

The spacing between the recesses 66 and 74, as determined by the offset between passivation openings 50 and 54, substantially defines the thickness of flexible member 24. Similarly, the spacing between recesses 68 and 76, as substantially determined by the offset between passivation openings 52 and 56, defines the thickness of flexible member 26.

FIG. 3C illustrates the resulting structure after the photo resist material has been removed. For clarity in illustration, passivation layers 43 and 45 are not shown in FIG. 3C.

Those skilled in the art will recognize that different crystaline structures will result in recesses of different shapes. For example, a {100} crystaline structure results in the recesses as described later herein with particular reference to FIGS. 4 and 5. It should also be noted that the formation of multiple flexible members, as described herein, provides the advantage of requiring only a single etching step from a single substrate.

Figure 4:
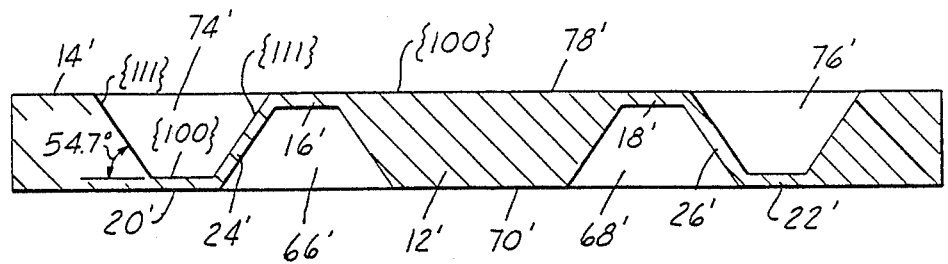
FIG. 4 is a cross-sectional view of an alternate embodiment in which the invention is used to advantage.
Figure 5:
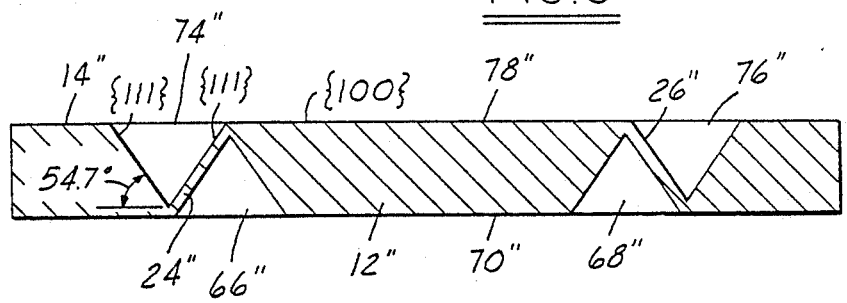
FIG. 5 is a cross-sectional view of another alternate embodiment in which the invention is used to advantage.

Referring now to FIGS. 4 and 5, wherein like numerals relate to like parts shown in FIGS. 1 and 2, wet etching in {100} wafers of silicon is shown. In a {100} crystaline structure, the lateral {111} planes intersect the normal {100} plane at an angle of 54.7°. An anisotropic etchant, as described hereinabove, acts against the {100} planes at a rate approximately 100 times greater than the {111} planes. Accordingly, the etchant acts against the {100} planes leaving etched volumes bounded by the {111} planes.

For the embodiment shown in FIG. 4, the etchant step is timed such that the etching against the {100} planes defines the thickness of flexible members 16', 18', 20' and 22'. Flexible members 24' and 26', however, have a thickness essentially determined by the positioning of the passivation openings (not shown) with respect to one another. That is, since the etchant acts against the {111} planes at a rate approximately only 1/100th the {100} planes, the spacing of those {111} planes extending from the opposing passivation openings essentially determines the thickness of flexible members 24' and 26'. It is to be noted, however, that some etching against the {111} planes will occur dependent upon the etching time. Accordingly, the thickness of flexible members 24' and 26' is not perfectly defined by the spacing of the passivation openings with respect to one another.

Although the photo resist openings are not shown in FIG. 4, it is apparent to one skilled in the art that they may be defined as the intersection of recesses 66' and 68' with surface 70', and recesses 74' and 76' with surface 78'.

Referring now to the embodiment shown in FIG. 5, wherein another {100} silicon substrate is illustrated, it is seen that the {111} planes defining the outer walls of recesses 66'', 68'', 74'' and 76'' intersect or converge within the silicon substrate. That is, the {111} planes extending from the perimeter of each passivation opening (not shown) intersect within the silicon substrate. Since the anisotropic etchant etches against the {100} plane at a rate approximately 100 times greater than the {111} planes, the anisotropic etchant etches against the {100} plane to the intersection of the {111} planes as illustrated in FIG. 5. At the intersecting point the etch rate drops drastically giving the operator more than sufficient time to remove the wafer from the etchant and wash the wafer clean of etchant chemicals.

It is to be noted that extending the perimeter of the passivation openings (not shown) such that the {111} planes extending therefrom would converge off the substrate, would result in a structure similar to that shown in FIG. 4; provided, however, that the etching time is controlled to prevent etching of the {100} plane through the substrate. Accordingly, an advantage provided by the embodiment shown in FIG. 5 is that the etching time does not require strict control.

As previously described with respect to the embodiment shown in FIG. 1, another advantage obtained by the embodiments shown in both FIGS. 4 and 5 is that multiple flexible members are obtained on a single substrate by a single etching step.

Figure 6:
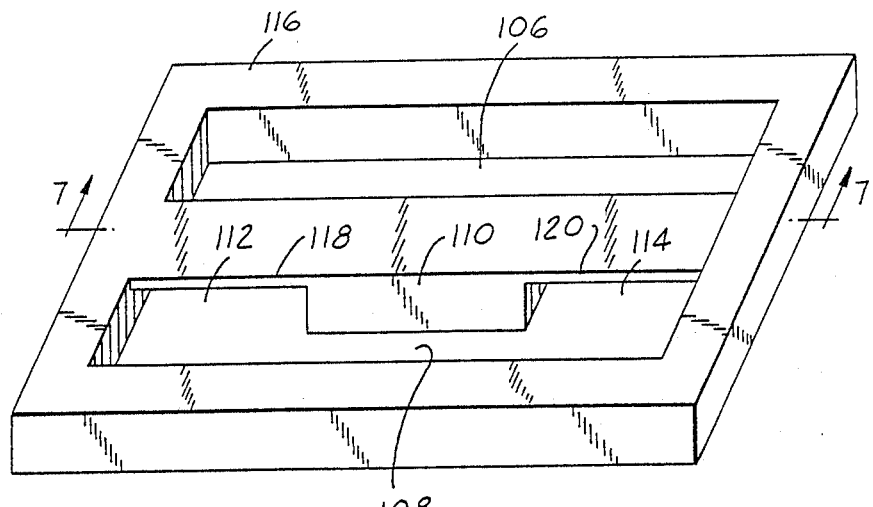
FIG. 6 is a perspective view of still another alternate embodiment in which the invention is used to advantage.
Figure 7:
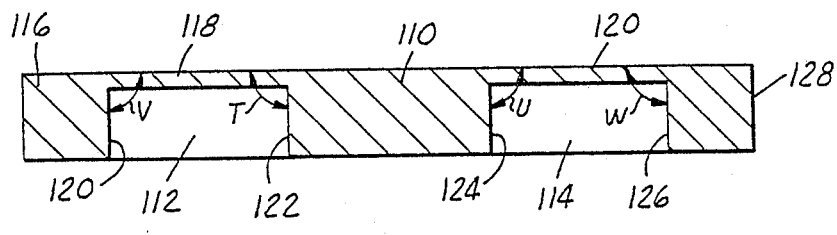
FIG. 7 is a cross-sectional view taken along line 7—7 of FIG. 6.

Another alternate embodiment is now described with particular reference to FIGS. 6 and 7. Suspended element 110 is here shown suspended between cavities 106 and 108. Support frame 116 and suspended element 110 are integrally connected by a single pair of symmetrical flexible members comprising flexible member 118 and flexible member 120. Angle T is defined as the angle between flexible member 118 and outer end 122 of suspended element 110. Similarly, angle U is defined as the angle between flexible member 120 and outer end 124 of suspended element 110. The angle between flexible member 118 and inner end 120 of frame 116 defines angle V. Similarly, angle W is defined as the angle between flexible member 120 and inner end 126 of frame 116.

Deflection of suspended element 110 is restrained to be rectilinear by the symmetrical bending of flexible members 118 and 120. In response to an upwardly applied force, for example, localized bending moments at a bending axis near the boundary between flexible members 118 and outer end 122 result in a reduction of angle T. As a result of the symmetrical positioning of flexible members 118 and 120, angle U is concurrently reduced by the same degree as angle T. In a similar manner, angles V and W are increased by the same degree. Accordingly, suspended element 110 moves in a rectilinear direction in response to an applied force. Since the structure illustrated in FIGS. 5 and 6 is constructed of a material wherein strain is a linear function of applied stress, herein shown as silicon, the deflection of suspended element 110 is also linearly proportional to the applied force.

Figure 8:
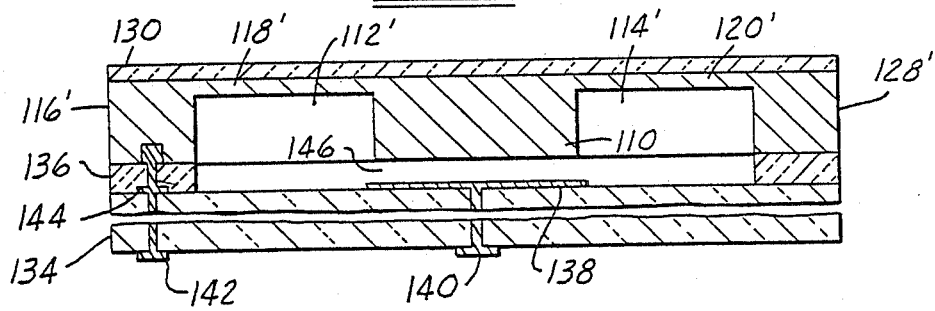
FIG. 8 illustrates a modification of the embodiment shown in FIGS. 6 and 7 for use as a pressure transducer.

Another alternate embodiment is shown in FIG. 8 wherein the structure depicted in FIGS. 6 and 7 is adapted for use as a pressure sensor Referring to FIG. 8, wherein like numerals refer to like parts shown in FIGS. 6 and 7, the silicon wafer is doped to be a p-type semiconductor by conventional diffusion of an impurity such as boron into the silicon wafer. A layer of silicon oxide 130 is grown by the use of well-known techniques over the top of wafer 128'. Accordingly, after the underside etching of cavities 106' and 108' (FIG. 7), and of recesses 112' and 114', a seal of silicon oxide will remain for preventing the flow of a fluid through cavities 106' and 108'.

Silicon wafer 128' is shown bonded to an insulating substrate such as glass substrate 134. An insulating layer 136, preferably silicon oxide grown on the bottom side of wafer 128', is shown positioned between wafer 128' and glass substrate 134. Metal plate 138, preferably of aluminum, is shown deposited on glass substrate 134 below suspended element 110 to form one electrode of a plate capacitor as described hereinbelow. Metal contact 140, preferably aluminum, is shown extending through substrate 134 for providing an external electrical contact to metal plate 138. Similarly, metal contact 142 is shown extending through glass substrate 134 for contacting with wafer contact 144, shown coupled to wafer 128' in a conventional manner.

As shown in FIG. 8, suspended element 110 and metal plate 138 form two plates of a capacitor having an air dielectric 146 therebetween. Accordingly, in response to a change in pressure against suspended element 110, a corresponding change in capacitance is detected by conventional electronic circuitry (not shown) across contacts 140 and 142. Since suspended element 110 is rectilinearly deflected and the amount of deflection is linearly proportional to the applied pressure, the change in capacitance is linearly proportional to the applied pressure. Accordingly, a very linear measurement of pressure is obtained.

Although fabrication has been illustrated using silicon in the embodiments shown hereinabove, those skilled in the art will recognize that numerous other substrates may be used to advantage. A silicon substrate, however, may be advantageous to use in applications wherein electronic circuitry is fabricated on the same silicon substrate using techniques well known in the microelectronics industry. Further, the silicon may be doped to carry electrical current thereby minimizing the need for external electronic circuitry.

This concludes the description of the preferred embodiment. The readig of it by those skilled in the art will bring to mind many alterations and modifications without departing from the spirit and scope of the invention. Accordingly, it is intended that the scope of the invention be limited only by the following claims.

I claim:

1. A method for forming a suspended element from a {100} silicon substrate wherein movement of the suspended element is rectilinear and proportional to an external force, comprising the steps of:

etching two cavities in said substrate thereby defining a center member between said cavities having a first planar face and an opposing second planar face, said cavities also defining a supporting frame connected to opposing ends of said center member;

forming a passivation layer on said first planar face with a pair of passivation openings symmetrically positioned on said first planar face for anisotropic etching in a subsequent step, each of said passivation openings having dimensions such that the set of {111} planes adjacent said passivation opening define a point of convergence beyond said silicon substrate;

applying an anisotropic etching to said passivation openings for forming a pair of recesses in said center member thereby defining said suspended element; and timing said step of anisotropic etching such that each of said pair of recesses forms a narrowed portion of said center member between said second planar surface and each of said recesses, said narrowed portions defining a pair of flexing members for providing rectilinear deflection of said suspended element in linear proportion to the applied force.

2. A method for forming a suspended element from a {100} silicon substrate wherein movement of the suspended element is rectilinear and proportional to an external force, comprising the steps of:

etching two cavities in said substrate thereby defining a center member between said cavities having a first planar face and an opposing second planar face, said cavities also defining a supporting frame connected to opposing ends of said center member;

forming a passivation layer on said first planar face having a first pair of passivation openings symmetrically positioned on said first planar surface and forming a passivation layer on said second planar surface having a second pair of passivation openings symmetrically positioned on said second planar surface and offset from said first pair of passivation openings, each of said passivation openings having dimensions such that the set of {111} planes adjacent each of said passivation opening define a point of convergence within said silicon substrate;

applying an anisotropic etchant to said passivation openings for forming a frrst pair of recesses through said first planar surface and a second pair of recesses through said second planar surface wherein said suspended element is defined as the portion of said center member between said first pair of recesses; and timing said step of anisotropic etching to form a narrowed portion of said center member between each of said first pair of recesses and each of said second pair of recesses, said narrowed portions defining a pair of flexing members for providing rectilinear deflection of said suspended element in linear proportion to the applied force.

* * * * *